Nov. 15, 1932.   V. B. BONNEY ET AL   1,887,850
APPARATUS FOR TESTING AND MEASURING THE HARDNESS
AND TOUGHNESS OF FRUITS AND VEGETABLES
Filed Jan. 19, 1931
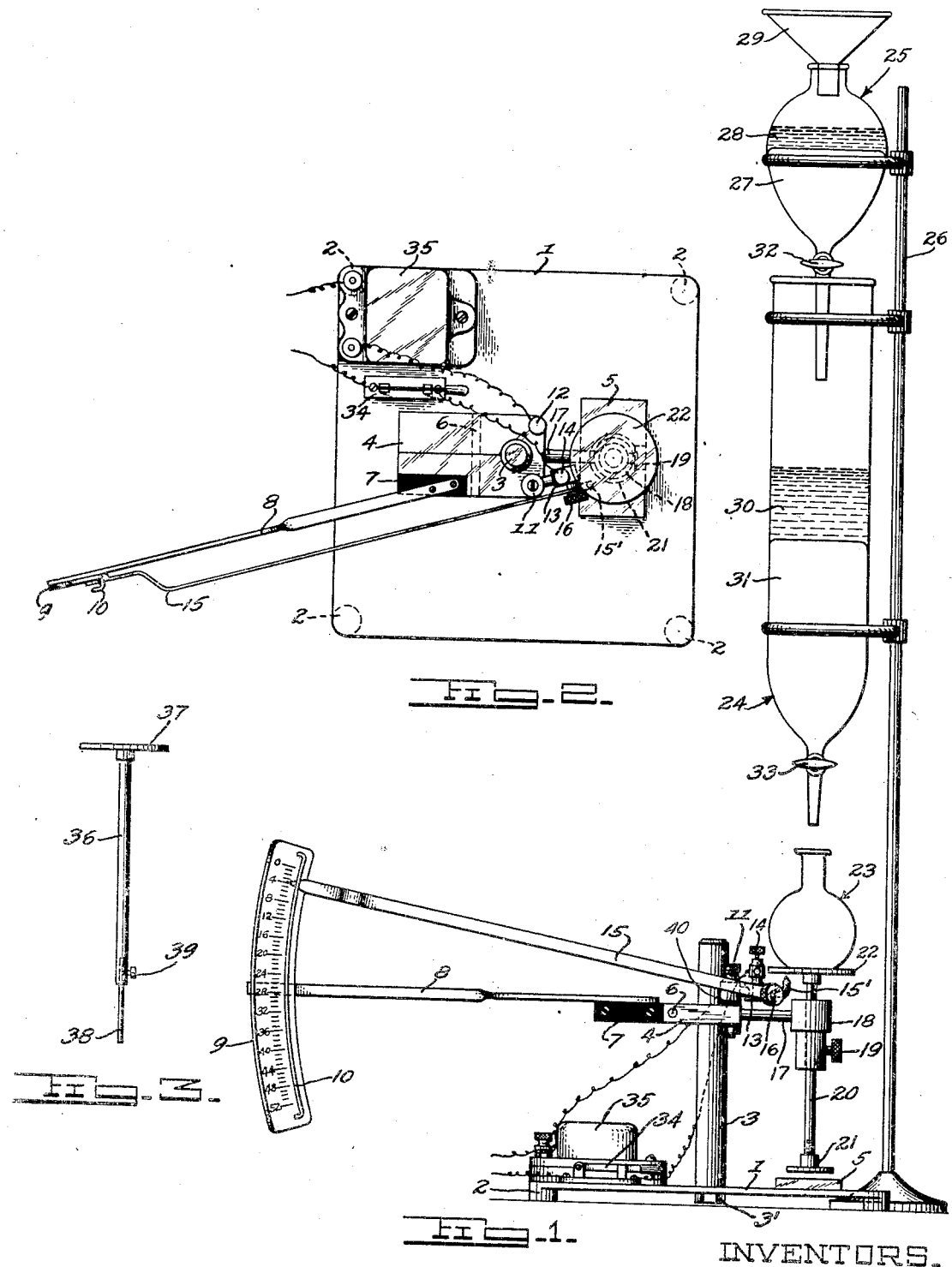
INVENTORS.
Victor B. Bonney
Paul A. Clifford Patented Nov. 15, 1932

1,887,850

UNITED STATES PATENT OFFICE

VICTOR B. BONNEY AND PAUL A. CLIFFORD, OF WASHINGTON, DISTRICT OF COLUMBIA, DEDICATED TO THE GOVERNMENT AND THE PEOPLE OF THE UNITED STATES OF AMERICA

APPARATUS FOR TESTING AND MEASURING THE HARDNESS AND TOUGHNESS OF FRUITS AND VEGETABLES

Application filed January 19, 1931. Serial No. 509,812.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public to take effect upon the granting of a patent to us.

This invention relates to an apparatus created and designed for the purpose of testing and measuring the hardness and toughness of fruits and vegetables, particularly cooked or canned fruits and vegetables. In determining the quality of cooked and/or canned food it is often necessary to determine the hardness or toughness of the commodity. This has formerly been done by means of organoleptic examination and has resulted in considerable variations in opinions relating to different grades. The object of the present invention is the creation of an apparatus for the mechanical determination of this hardness or toughness.

In the accompanying drawing, Fig. 1 is a side elevation of the entire apparatus; Fig. 2 is a plan view of the device; Fig. 3 is a detailed view of the plunger to which further reference is hereinafter made, detached from the apparatus.

Various parts of the apparatus are designated in the drawing by numerals.

The apparatus is mounted upon a base plate 1, (Figs. 1 and 2) supported by the four legs 2, which may be equipped with threaded leveling screws. A vertical brass rod 3, supports the table 4, which is clamped by means of the screw 6, in such a way that the height of the mechanism can be adjusted by sliding the table 4, up and down the supporting rod 3. A fiber block 7, insulates the graduated scale 9, supported by its arm 8, from the rest of the instrument. A wire guard 10 holds the pointer 15, in close proximity to the scale, thus permitting of accurate reading. The pointer 15, is pivoted by means of a knurled screw 16, and its short arm is turned to a sensitive contact point 15'. Moving the pointer up and down the scale makes or breaks contact between this contact point and the bottom of the plate 22 which is attached to the upper end of a vertical plunger 20. The pointer is mounted upon an elbow 13, which is fastened to the table 4, by means of screw 11, and insulated from the table by means of a fiber sleeve 40. The two binding posts 12 and 14, are wired in series with a switch 34, and buzzer 35, and a source of electric current in such a way that the buzzer sounds when contact is made between 15' and 22, the current flowing from one pole of a battery, or other source of electrical current through the buzzer, thence to binding post 12, through the metal arm 17, through the plunger rod 20, and plate 22, through contact point 15' to binding post 14, which is insulated from the rest of the frame, thence through switch 34 to opposite pole of the battery, or other source of electric current. A metal arm 17, supports the sleeve 18, through which the plunger 20, slides up and down with as little friction as possible. The plunger can be held in any fixed position by means of the knurled screw 19. The plunger is equipped at its bottom end with a flat, metal, removable disc 21 which screws into the hollow threaded end of the plunger by means of a threaded tip, and which meets the removable plate 5, when the pointer reads zero and 22 has made contact with 15'.

A mercury burette 24, is suggested as a convenient means of adding weight at constant rate to the platform 22, and a flask 23, holds the mercury. Stopcocks 32 and 33, are calibrated to deliver mercury 31 and 27, at the same rate. The supplementary mercury reservoir 25, delivers mercury to the burette as fast as it is drained out when the stopcocks are operated in unison, thus maintaining a constant head of mercury in the burette and constant rate of flow from the lower stopcock 33. A weak nitric acid solution covers the mercury both in the burette and reservoir 30 and 28, preventing its oxidation and maintaining it in a state of purity. A ringstand 26, supports the burette and reservoir, and a funnel 29, is used for convenience in handling the mercury.

Fig. 3 is a detail of the plunger used when the resistance to penetration is to be measured. The metal rod 36, and the platform 37, are analogous to 20 and 22, in Figs. 1 and 2. In this case, an untapered needle 38, is inserted in the hollow lower end of the rod and secured in place by means of the set screw 39.

In order to determine the hardness of the cooked or canned food with the apparatus described, the commodity is placed upon a smooth surface under and in contact with the plate 21. The thickness of the unit of food is then measured by carrying the pointer 15, down the scale 9, until the buzzer 35, sounds due to contact between the plate 22, and the contact point on the short arm of the pointer 15'. The reading on the scale is then noted and the pointer is brought back to a point on the scale representing some convenient fraction of the thickness of the product to which it is desired to crush the food. Weight is then added to the container 23, placed on the plate 22, at a uniform rate until the unit of food is crushed to the predetermined proportion of its thickness which point in the process is indicated by the sounding of the buzzer or by some other device such as an electric light. After the completion of the test the weight of mercury necessary to effect crushing is determined by weighing the flask and mercury on an ordinary platform scale.

In case toughness of a commodity is to be measured, the untapered needle is inserted in the hollow rod of the plunger 20, in the place of plate 21. The commodity to be tested is confined in a suitable container to prevent the spreading thereof, and placed under and in contact with the untapered needle. Weight is then added to the plunger until the needle completely perforates the commodity being tested. This point of completion of the test is indicated by an abrupt drop of the plunger 36. The weight of mercury necessary to effect penetration is determined as before described. The pointer 15, the scale 9 and the buzzer 35, are not utilized when resistance to penetration is being determined.

For example, when the hardness of peas is the question involved, weight required to crush one-half a peeled pea to one-quarter its thickness is determined. In the case of canned peaches or pears, determination is made of the weight required to cause a rod or untapered needle $\tfrac{5}{32}''$ in diameter to completely penetrate a portion of the fruit.

In our experiments mercury has been used as a convenient material for adding weight at a uniform rate. However, any convenient substance may be used to add weight at a uniform rate.

Having fully disclosed our discovery, we claim as our invention:

An apparatus for determining the hardness and toughness of fruit and vegetable specimens comprising a base, a stationary upright rod supported by the base, a table movably attached to the rod, an arm attached to and extending horizontally from the table, a graduated scale supported by the free end of said arm; a pointer having a long and short arm pivotally attached to said table, the long arm of the pointer extending toward and close to said graduated scale; a metal arm extending horizontally from said table; an adjustable vertical plunger removably attached to said metal arm and having a flat plate horizontally affixed to the upper end thereof and located immediately over the end of the short arm of the pointer; a specimen contacting member removably attached to the lower end of the plunger; means to supply added weight at a controlled and uniform rate to the upper plate; a buzzer and an electrical source and means to complete an electrical circuit through the buzzer and source when contact is established between the short arm of the pointer and the plate on the upper end of the plunger.

VICTOR B. BONNEY.
PAUL A. CLIFFORD.